United States Patent
Lim et al.

(10) Patent No.: US 9,788,372 B2
(45) Date of Patent: Oct. 10, 2017

(54) GATE OFF DELAY COMPENSATION CIRCUIT AND LIGHT APPARATUS HAVING THE SAME

(71) Applicant: Magnachip Semiconductor, Ltd., Cheongju-si (KR)

(72) Inventors: Gyu Ho Lim, Cheongju-si (KR); Jong Hyun Yoon, Cheongju-si (KR); Zhi Yuan Cui, Cheongju-si (KR); Yong Gi Ryu, Seoul (KR)

(73) Assignee: Magnachip Semiconductor, Ltd., Cheongju-si (KR)

( * ) Notice: Subject to any disclaimer, the term of this patent is extended or adjusted under 35 U.S.C. 154(b) by 0 days.

(21) Appl. No.: 15/051,371

(22) Filed: Feb. 23, 2016

(65) Prior Publication Data

US 2016/0270171 A1     Sep. 15, 2016

(30) Foreign Application Priority Data

Mar. 13, 2015   (KR) .......................  10-2015-0035237

(51) Int. Cl.
*H05B 33/08*   (2006.01)

(52) U.S. Cl.
CPC ..... *H05B 33/0815* (2013.01); *H05B 33/0845* (2013.01)

(58) Field of Classification Search
None
See application file for complete search history.

(56) References Cited

U.S. PATENT DOCUMENTS

| 5,469,094 A | 11/1995 | Nessi | |
| 2013/0127354 A1* | 5/2013 | Chiang | H02M 7/06 315/193 |
| 2016/0065055 A1* | 3/2016 | Lim | H02M 1/4208 315/200 R |
| 2016/0081154 A1* | 3/2016 | Lim | H05B 33/0815 315/247 |
| 2016/0081158 A1* | 3/2016 | Lim | H05B 33/0818 315/165 |

\* cited by examiner

*Primary Examiner* — Jany Richardson
(74) *Attorney, Agent, or Firm* — NSIP Law

(57) ABSTRACT

A gate off delay compensation circuit includes a sensing interval determiner configured to determine an interval in which a driving voltage corresponds to a first and second level of a reference voltage as a driving voltage sensing interval, a driving voltage excess interval determiner configured to determine a driving voltage excess interval defined as an interval in which the driving voltage is larger than the reference voltage and a driving voltage period determiner configured to determine a period of the driving voltage based on the driving voltage sensing interval and the driving voltage excess interval. Therefore, a gate off delay compensation circuit 100 decreases an average driving current and an average driving voltage and allows decrease of a variation of a driving current according to a change of a input voltage $V_{IN}$.

20 Claims, 7 Drawing Sheets

GATE OFF DELAY COMPENSATION CIRCUIT AND LIGHT APPARATUS HAVING THE SAME

CROSS-REFERENCE TO RELATED APPLICATION(S)

This application claims the benefit under 35 USC 119(a) of Korean Patent Application No. 10-2015-0035237 filed on Mar. 13, 2015 in the Korean Intellectual Property Office, the entire disclosure of which is incorporated herein by reference for all purposes.

BACKGROUND

1. Field

The following description relates to a method of driving a gate off delay compensation circuit. The following description further relates to a gate off delay compensation circuit and light apparatus having such a circuit used to control a switching period of a gate for decreasing an average driving current.

2. Description of Related Art

A Light Emitting Diode (LED) light apparatus substitutes for existing light apparatuses, as an LED light apparatus decreases power consumption compared with an existing alternative light source. Recently, an LED light apparatus may adopt an AC-coupled driving circuit to directly use not a DC current source but instead use an AC current source. Such an AC-coupled driving circuit may charge an inductor using an input current according to a certain period, and may drive an LED through an energy stored in an inductor. An ideal AC-coupled driving circuit has a driving current and a driving voltage whose maximum values or peak values are fixed by a reference voltage but an actual AC-coupled driving circuit may generate a gate off delay and propagation delay during the process of operating of a switching element and driving of a circuit. Maximum values or peak values of a driving current and a driving voltage may increase along with an input voltage, according to a gate off delay and a propagation delay.

In other words, an AC-coupled driving circuit may increase an average driving current along with an increase of an input voltage, according to a gate off delay and a propagation delay, and thereby may reduce an efficiency of an integrated circuit and may generate a heating phenomenon in a system.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

One example proposes a gate off delay compensation circuit and light apparatus configured to control a period of a driving voltage to reduce an average driving current.

One example proposes a gate off delay compensation circuit and a light apparatus configured to extend a period of a driving voltage up to an interval that is proportional to a driving voltage excess interval.

One example proposes a gate off delay compensation circuit and light apparatus configured to extend a period of a driving voltage to compensate for a driving current.

In one general aspect, a gate off delay compensation circuit includes a sensing interval determiner configured to determine an interval in which a driving voltage corresponds to a first level and second level of a reference voltage as a driving voltage sensing interval, a driving voltage excess interval determiner configured to determine a driving voltage excess interval defined as an interval in which the driving voltage is larger than the reference voltage, and a driving voltage period determiner configured to determine a period of the driving voltage based on the driving voltage sensing interval and the driving voltage excess interval.

The sensing interval determiner may include a reference voltage generator configured to receive a dimming voltage related to a light brightness to generate the reference voltage.

The reference voltage generator may include a Digital Analog Converter (DAC) configured to output a voltage corresponding to a value of current induced by the dimming voltage.

The reference voltage generator may further include a voltage follower configured to follow the output voltage to generate the reference voltage.

The sensing interval determiner may include a voltage divider configured to divide the reference voltage into a first interval reference voltage having a first level and a second interval reference voltage having a second level.

The sensing interval determiner may include a period determination voltage generator configured to generate each of a first period determination voltage and a second period determination voltage by charging and discharging each of a first capacitor and a second capacitor, wherein the first capacitor and the second capacitor have different capacitances.

The sensing interval determiner may include a first capacitor configured to respond to the reference voltage, to be charged from an initial point of the period to an end point of the period, and to be discharged in the driving voltage excess interval, and a second capacitor configured to be charged during the driving voltage sensing interval.

The sensing interval determiner may include a first switching element connected to a terminal of the first capacitor in series and a second switching element connected to the terminal in parallel, wherein the first switching element receives a first enable signal at the initial point of the period and the second switching element receives a second enable signal at an initial point of the driving voltage excess interval.

The sensing interval determiner may include a third switching element connected to a terminal of the second capacitor in series and a fourth switching element connected to the terminal in parallel, wherein the third switching element receives a third enable signal at an initial point of the driving voltage sensing interval and the fourth switching element receives a fourth enable signal at an end point of the driving voltage sensing interval.

The driving voltage excess interval determiner may receive a first interval reference voltage and a second interval reference voltage, the reference voltage and the driving voltage to generate a first enable signal, a second enable signal, a third enable signal or a fourth enable signal.

The driving voltage excess interval determiner may provide a first enable signal, a second enable signal, a third enable signal or a fourth enable signal to respectively control a first switching element, a second switching element, a third switching element or a fourth switching element.

The driving voltage period determiner may receive a first period determination voltage and a second period determination voltage from the sensing interval determiner to generate a driving signal.

The driving voltage period determiner may provide a driving signal from an initial point of the period to an initial point of the driving voltage excess interval.

In another general aspect, a light emitting diode light apparatus includes Light Emitting Diodes (LEDs), a bridge diode configured to full-wave rectify an alternating current (AC) input voltage, and a gate off delay compensation circuit configured to receive a driving power supply to drive the LEDs, wherein the gate off delay compensation circuit comprises a sensing interval determiner configured to determine an interval in which a driving voltage corresponds to a first level and second level of a reference voltage as a driving voltage sensing interval, a driving voltage excess interval determiner configured to determine a driving voltage excess interval defined as an interval in which the driving voltage is larger than the reference voltage and a driving voltage period determiner configured to determine a period of the driving voltage based on the driving voltage sensing interval and the driving voltage excess interval.

In another general aspect, a circuit includes a driving voltage period determiner configured to determine a period of a driving voltage based on a driving voltage sensing interval and a driving voltage excess interval, wherein the driving voltage sensing interval is an interval in which a driving voltage corresponds to a first level and second level of a reference voltage and the driving voltage excess interval is defined as an interval in which the driving voltage is larger than the reference voltage.

The circuit may further include a sensing interval determiner configured to determine the driving voltage sensing interval.

The sensing interval determiner may include a voltage divider configured to divide the reference voltage into a first interval reference voltage having a first level and a second interval reference voltage having a second level.

The sensing interval determiner may include a period determination voltage generator configured to generate each of a first period determination voltage and a second period determination voltage by charging and discharging each of a first capacitor and a second capacitor, wherein the first capacitor and the second capacitor have different capacitances.

The sensing interval determiner may include a first capacitor configured to respond to the reference voltage, to be charged from an initial point of the period to an end point of the period, and to be discharged in the driving voltage excess interval, and a second capacitor configured to be charged during the driving voltage sensing interval.

The circuit may further include a driving voltage excess interval determiner configured to determine the driving voltage excess interval.

According to one example, a gate off delay compensation circuit and light apparatus control a period of a driving voltage to reduce an average driving current.

According to one example, a gate off delay compensation circuit and light apparatus extend a period of a driving voltage up to an interval that is proportional to a driving voltage excess interval.

According to one example, a gate off delay compensation circuit and light apparatus extend a period of a driving voltage to compensate a driving current.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
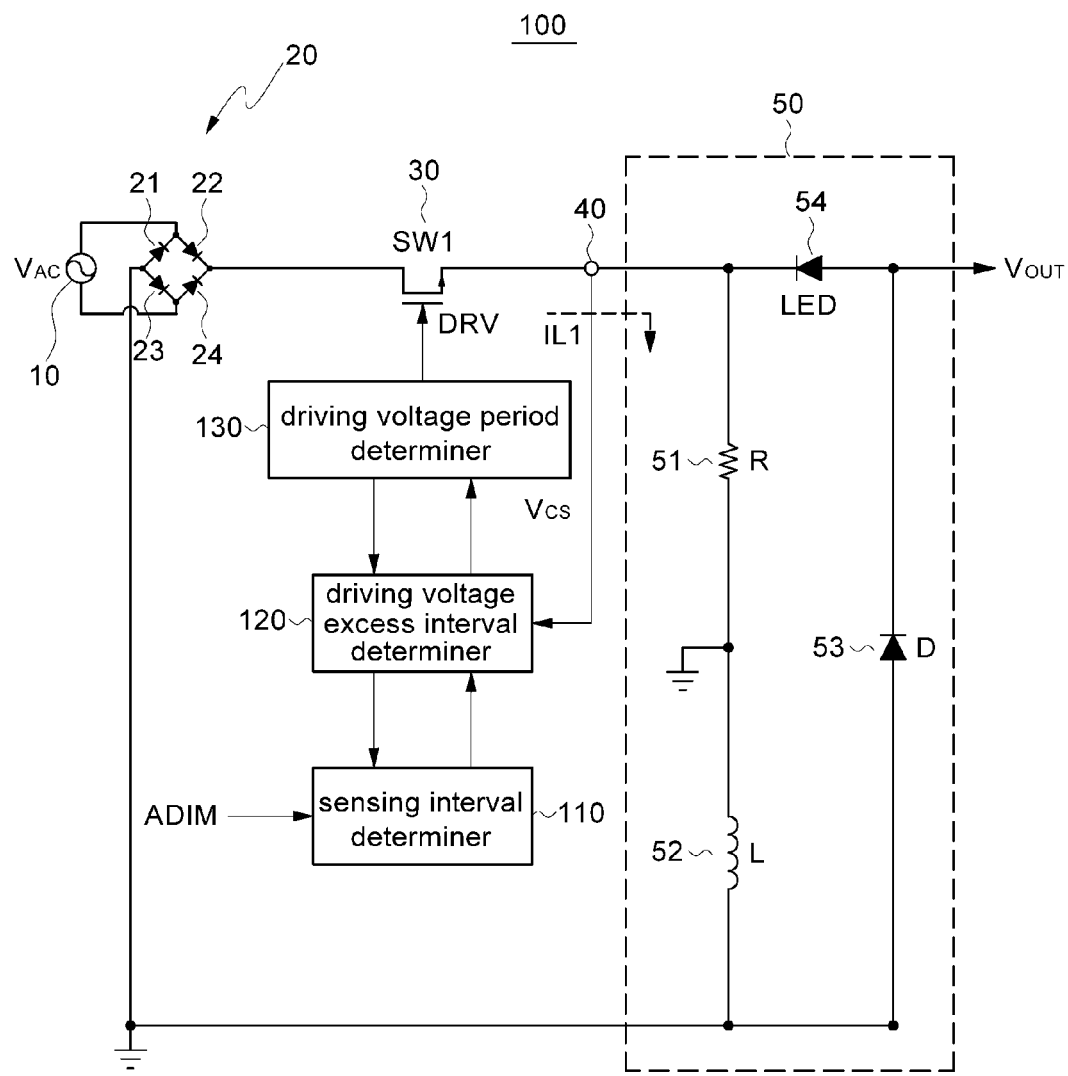
FIG. 1 is a block diagram illustrating a gate off delay compensation circuit and light apparatus according to an example.

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

While terms such as "first," "second," and the like, are used to describe various components, such components are not to be understood as being limited to these terms. These terms are merely used to help the reader to distinguish one component from another.

It is to be understood that when an element is referred to as being "connected to" or "connected with" another element, the element is potentially directly connected to the other element or intervening elements are also optionally present. In contrast, when an element is referred to as being "directly connected to" another element, no intervening elements are present, except where the context makes it clear that other intervening elements are possibly present. In addition, unless explicitly described to the contrary, the word "comprise" and variations such as "comprises" or "comprising," or synonyms such as "including" or "having," are to be understood to imply the inclusion of stated elements but not the exclusion of any other elements. Meanwhile, other expressions describing relationships between components such as "between", "immediately between" or "adjacent to" and "directly adjacent to" are to be construed similarly.

Singular forms "a", "an" and "the" in the present disclosure are intended to include the plural forms as well, unless the context clearly indicates otherwise.

Devices that are in communication with each other are not required to be in continuous communication with each other, unless expressly specified otherwise. In addition, devices that are in communication with each other possibly communicate directly or indirectly through one or more intermediaries.

Although process steps, method steps, algorithms, or the like, are described in the disclosure in a sequential order, such processes, methods and algorithms are also optionally configured to work in alternate orders. In other words, any sequence or order of steps that is described does not necessarily indicate a requirement that the steps be performed in that order. Thus, the steps of the processes, methods or algorithms described herein are optionally performed in any order practical. Further, some steps are possibly performed simultaneously.

When a single device or article is described herein, it is to be readily apparent that more than one device or article is optionally used in place of a single device or article. Similarly, where more than one device or article is described herein, it is to be readily apparent that a single device or article is optionally be used in place of the more than one device or article. The functionality or the features of a device is possibly alternatively embodied by one or more other devices which are not explicitly described as having such functionality or features.

FIG. 1 is a block diagram illustrating a gate off delay compensation circuit and light apparatus according to an example.

Referring to the example of FIG. 1, a light apparatus includes an AC input power supply 10, a bridge diode 20, a driving switching element 30, a driving voltage sensing node 40, illumination unit or illuminator 50 and a gate off delay compensation circuit 100. A gate off delay compensation circuit 100 includes a sensing interval determination unit or sensing interval determiner 110, a driving voltage excess interval determination unit or driving voltage excess interval determiner 120 and a driving voltage period determination unit or driving voltage period determiner 130.

An AC input power supply 10 corresponds to a source of an AC input voltage $V_{AC}$. A frequency of an AC input voltage $V_{AC}$ possibly corresponds to, but is not necessarily limited to, 50 Hz or 60 Hz according to an AC input voltage provided by a power provider and possibly fluctuates according to an electric power supply system.

For example, a bridge diode 20 is electrically connected to an AC input power supply 10 and is formed by the connection of a plurality of diode elements 21, 22, 23, 24. Such a bridge diode 20 full-wave rectifies an AC input voltage $V_{AC}$. A full-wave rectified AC input voltage $V_{IN}$ is provided to the illuminator 50.

In the example of FIG. 1, a driving switching element 30 is connected between a driving voltage period determiner 130 and an illuminator 50. The driving switching element 30 receives a driving signal DRV to be turned on or turned off. A driving current IL1 flows through an inductor 52 when the driving switching element 30 is turned on and a current charged in the inductor 52 flows into an LED module or LED 54 through a diode 53 when the driving switching element 30 is turned off. In one example, the driving switching element 30 is formed using a transistor. For example, a driving signal DRV is transmitted to a gate terminal of a transistor to control a flow of a driving current IL1.

In this example, a driving voltage sensing node 40 is electrically connected between the driving switching element 30 and the illuminator 50. A driving voltage Vcs is sensed at the driving voltage sensing node 40 to be supplied to a driving voltage excess interval determiner 120.

For example, the illuminator 50 includes a sensing resistor 51, inductor 52, a diode 53 and a Light Emitting Diode (LED) 54.

In one example, a driving signal DRV turns on the driving switching element 30 based on a positive value, such as a high level or 1, and turns off the driving switching element 30 based on a negative value, such as a low level or 0. In this example, a driving current IL flows into the sensing resistor 51 and the inductor 52 and energy of a driving current IL1 is stored into the inductor 52 when the driving switching element 30 is turned on. Such energy stored in the inductor 52 is provided into the LED 54 when the driving switching element 30 is turned off. In other words, the inductor 52 operates as a current source when the driving switching element 30 is turned off. Thus, a current flows into the LED 54 through the diode 53 and the LED 54 is driven based on energy stored in the inductor 52. An AC-coupled light apparatus regulates an output, namely, a driving current IL1, to adjust a brightness of the LED 54.

In one example, the LED 54 is formed into n groups as a form including, as appropriate, a series, parallel and series-parallel connection of each of an LED to be included. A plurality of LEDs 54 are provided with a full-wave rectified AC input voltage $V_{IN}$ from a bridge diode 20 to act as the driving voltage.

In the example of FIG. 1, a sensing interval determiner 110 receives a dimming voltage ADIM from the outside. Here, the sensing interval determiner 110 receives a dimming voltage ADIM having a first voltage level in order to generate a reference voltage $V_{REF}$ that has a second voltage level. For example, the sensing interval determiner 110 determines an interval in which a driving voltage corresponds to a first and second level of a reference voltage $V_{REF}$ as a driving voltage sensing interval. In an example, a driving voltage Vcs in a driving voltage sensing interval is linear. More specifically, the sensing interval determiner 110 generates a first interval reference voltage and a second interval reference voltage through a voltage drop of a reference voltage $V_{REF}$. In one example, a first interval reference voltage and a second interval reference voltage correspond, but are not necessarily limited to, $0.8*V_{REF}$ and $0.3*V_{REF}$. In other words, the sensing interval determiner 110 determines a driving voltage sensing interval through a first interval reference voltage and a second interval reference voltage, and supplies a first interval reference voltage, a second interval reference voltage and a reference voltage $V_{REF}$ to a driving voltage excess interval determiner 120.

In the example of FIG. 1, the driving voltage excess interval determiner 120 is electrically connected to the sensing interval determiner 110 and a driving voltage sensing node 40. For example, the driving voltage excess interval determiner 120 receives a driving voltage Vcs from the driving voltage sensing node 40. The driving voltage excess interval determiner 120 determines a driving voltage excess interval defined as an interval in which a driving voltage Vcs is larger than a reference voltage $V_{REF}$. Also, the driving voltage excess interval determiner 120 receives a first interval reference voltage and a second interval reference voltage, a reference voltage $V_{REF}$ and a driving voltage Vcs in order to generate a first enable signal, a second enable signal, a third enable signal or a fourth enable signal.

For example, a driving voltage period determiner 130 is electrically connected to the sensing interval determiner 110 and the driving voltage excess interval determiner 120. Also, the driving voltage period determiner 130 receives a first period determination voltage VT1 and a second period determination voltage VT2 in order to generate a driving signal DRV. For example, the driving voltage period determiner 130 determines a driving voltage Vcs based on a driving voltage sensing interval and a driving voltage excess interval.

Figure 2:
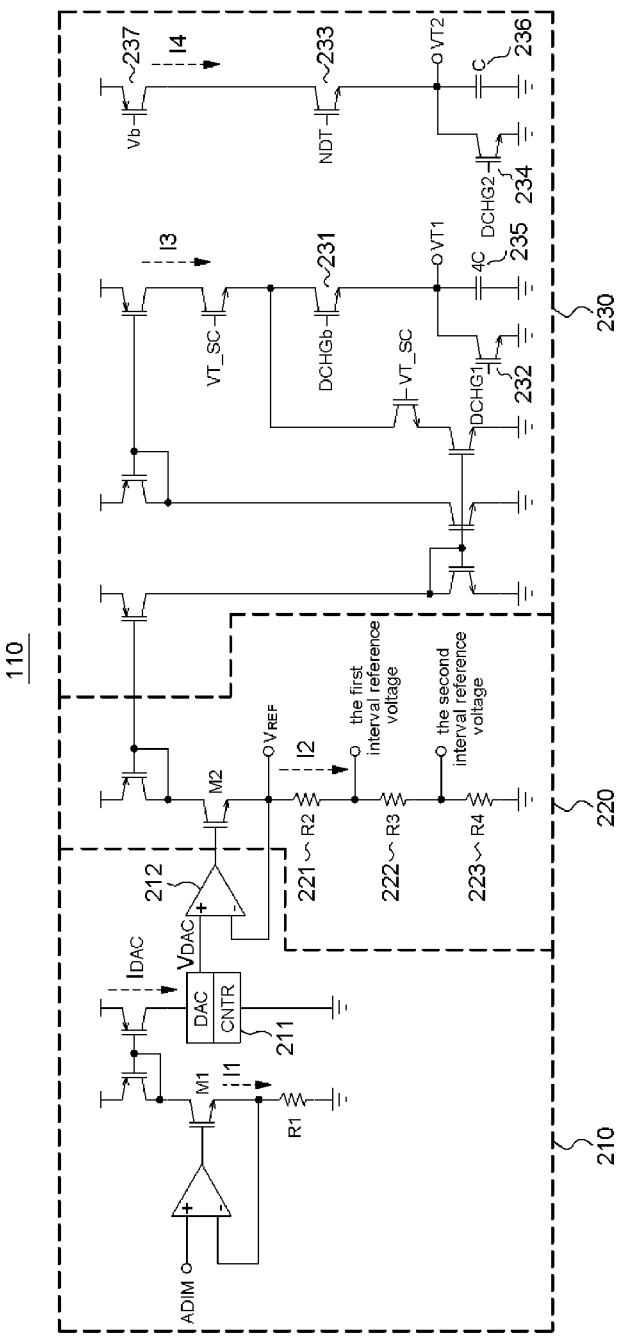
FIG. 2 is a circuit diagram illustrating a sensing interval determiner in the example of FIG. 1.

FIG. 2 is a circuit diagram illustrating a sensing interval determiner in the example of FIG. 1.

Referring to the example of FIG. 2, The sensing interval determiner 110 includes a reference voltage generation module or reference voltage generator 210, a voltage division module or voltage divider 220 and a period determination voltage generation unit or period determination voltage generator 230.

The reference voltage generator 210 receives a dimming voltage ADIM related to a light brightness from the outside. For example, the reference voltage generator 210 optionally includes at DAC (Digital Analog Converter) that outputs a voltage $V_{DAC}$ corresponding to a value of current $I_{DAC}$ induced by a dimming voltage ADIM. Also, the reference voltage generator 210 optionally includes a voltage follower that follows an output voltage $V_{DAC}$ in order to generate a reference voltage $V_{REF}$.

In one example, the reference voltage generation module or reference voltage generator 210 receives a dimming voltage ADIM to induce a current I1 through an operational amplifier OP-AMP and a resistor, where I1=ADIM/R1, and to induce a first mirroring current $I_{DAC}$ through mirroring an induced current I1, where I1=$I_{DAC}$. For example, a first mirroring current $I_{DAC}$ is converted to a voltage $V_{DAC}$ through a digital-analog converter (DAC), where $V_{DAC}$=$I_{DAC}$*$R_{DAC}$, and $R_{DAC}$ corresponds to an internal resistance of a digital-analog converter, and generates a reference voltage $V_{REF}$ having a second voltage level through an operational amplifier.

In the example of FIG. 2, the voltage divider 220 is disposed between the reference voltage generator 210 and the period determination voltage generator 230. For example, the voltage divider 220 divides a reference voltage $V_{REF}$ through a voltage drop in order to generate a first interval reference voltage and a second interval reference voltage. In one example, a reference voltage I2 is generated when a reference voltage $V_{REF}$ is supplied to both terminals of a plurality of resistance elements 221, 222, 223, where I2=$V_{REF}$/RT, RT=R2+R3+R4.

In this example, a reference voltage $V_{REF}$ is dropped when a reference current I2 flows through the plurality of resistance elements RT 221, 222, 223. A first interval reference voltage and a second interval reference voltage may be determined through a resistance ratio of the plurality of resistor elements RT 221, 222, 223. For example, if a resistance ratio of the plurality of resistor elements 221, 222, 223 is 2:5:3, a first interval reference voltage corresponds to 0.8*$V_{REF}$ and a second interval reference voltage corresponds to 0.3*$V_{REF}$. Therefore, a first interval reference voltage and a second interval reference voltage is determined though changing a resistance ratio of The plurality of resistor elements 221, 222, 223.

In the example of FIG. 2, the period determination voltage generator 230 is electrically connected to the voltage divider 220. Here, the period determination voltage generator 230 includes a first capacitor 235 and a second capacitor 236 having difference capacitances and generates a first period determination voltage VT1 and a second period determination voltage VT2 by a process of charging and discharging each of the first capacitor 235 and the second capacitor 236. Also, the period determination voltage generator 230 includes a first switching element 231 connected to a terminal of a first capacitor 235 in series and a second switching element 232 connected to the terminal of the first capacitor 235 in parallel, and also includes a third switching element 233 connected to a terminal of a second capacitor 236 in series and a fourth switching element 234 connected to the terminal of the second capacitor 236 in parallel.

In the example of FIG. 2, the period determination voltage generator 230 mirrors a current having same magnitude of a reference current I2 through a plurality of mirroring processes to induce a second mirroring current I3, where I2=I3=(ADIM+$R_{DAC}$)/(R1*RT). For example, the period determination voltage generator 230 charges the first capacitor 235 with a second mirroring current I3 that flows through the first switching element 231. For example, a second mirroring current I3 is charged with a second mirroring current I3 when the first switching element 231 is turned on and the second switching element 232 is turned off. However, the first capacitor 235 is discharged so that energy stored in the first capacitor 235 is released when the first switching element 231 is turned off and the second switching element 232 is turned on. For example, a first period determination voltage VT1 corresponds to a voltage supplied to both terminals of the first capacitor 235.

In this example, the period determination voltage generator 230 charges the second capacitor 236 with a current I4 that flows through a transistor 237 to which a bias voltage Vb is supplied. More specifically, the second capacitor 236 is charged with a current I4 when the third switching element 233 is turned on and the fourth switching element 234 is turned off. However, alternatively the second capacitor 236 is possibly discharged for energy stored in the second capacitor 236 to be released when the third switching element 233 is turned off and the fourth switching element 234 is turned on. In one example, the first switching element, the second switching element, the third switching element and the fourth switching element 231, 232, 233, 234 are each formed using a transistor. In this example, a second period determination voltage VT2 corresponds to a voltage supplied to both terminals of the second capacitor 236.

The period determination voltage generator 230 generates a certain period using a capacitance ratio of the first capacitor 235 and the second capacitor 236. In one example, it is provided that a capacitance ratio of the first capacitor 235 and the second capacitor 236 is 4:1. In this example, a voltage VT1 supplied to the first capacitor 235 corresponds to VT1=(I3*I4)/4C (ADIM*$R_{DAC}$*4T)/(R1*RT*4C), where T is a time value. As a result, a voltage VT1 supplied to the first capacitor 235 is changed according to a changing of a dimming voltage ADIM and the period determination voltage generator 230 that change together a magnitude of a current I3 for charging the first capacitor 25 in order to have a certain period T=(C*V)/I. Also, a voltage VT2 that is supplied to the second capacitor 236 corresponds to VT2=(I4*T)/C. As a capacitance of the second capacitor 236 and a magnitude of a current I4 are constant in the formula VT2=(I4*T)/C, when a voltage VT1 is changed according to the changing of a dimming voltage ADIM, a charging period T of the second capacitor 236 also changes, and thus a driving current IL1 is sensed during a certain interval.

Figure 3:
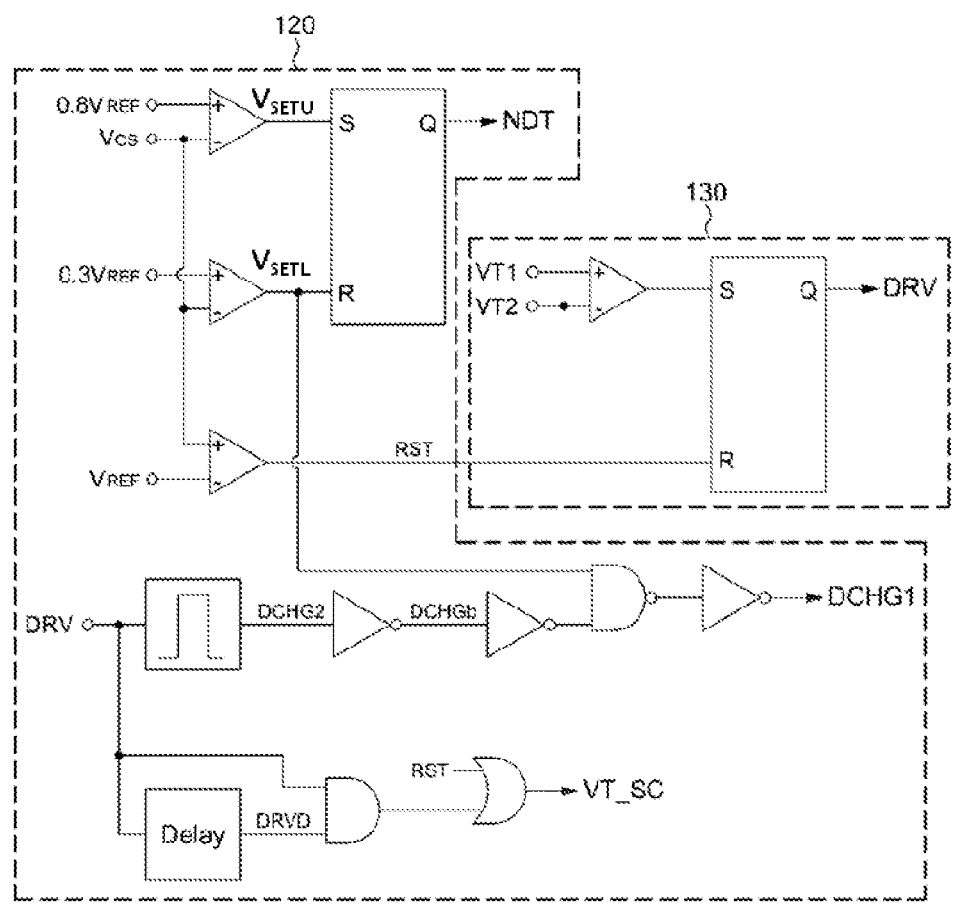
FIG. 3 is a circuit diagram illustrating a driving voltage excess interval determiner and a driving voltage period determiner in the example of FIG. 1.

FIG. 3 is a circuit diagram illustrating a driving voltage excess interval determiner and a driving voltage period determiner in the example of FIG. 1.

Referring to the example of FIG. 3, the driving voltage excess interval determiner 120 receives a driving voltage Vcs from the driving voltage sensing node 40 and compares a driving voltage Vcs with a reference voltage $V_{REF}$ in order to determine a driving voltage excess interval.

In the example of FIG. 3, the driving voltage excess interval determiner 120 controls the first switching element 231 and the third switching element 233 in order to control charging each of the first capacitor 235 and the second capacitor 236, and generates a first enable signal DCHGb, a second enable signal DCHG1, a third enable signal NDT and a fourth enable signal DCHG2 for controlling the second switching element 232 and the fourth switching element 234 in order to control discharging each of the first capacitor 235 and the second capacitor 236. In one example, the driving voltage excess interval determiner 120 generates a first enable signal DCHGb, a second enable signal DCHG1, a third enable signal NDT and a fourth enable signal DCHG2 in order to control each of the first switching element 231, the second switching element 232, the third switching element 233 and the fourth switching element 234. The first enable signal DCHGb, the second enable signal DCHG1, the third enable signal NDT and the fourth enable signal DCHG2 turn on each of the first switching element 231, the second switching element 232, the third switching element 233 and the fourth switching element 234 to have a positive value, such as a high level or 1, and turn off each of the first switching element 231, the second switching element 232, the third switching element 233 and the fourth switching element 234 to have a negative value, such as low level or 0.

The driving voltage period determiner 130 generates a driving signal DRV in order to control the driving switching element 30. More specifically, the driving voltage period determiner 130 receives a first period determination voltage VT1, a second period determination voltage VT2 and a reset signal RST that is an output of the driving voltage excess interval determiner 120. In one example, the driving voltage period determiner 130 provides an operational amplifier output of received voltages VT1, VT2 and a reset signal RST into a SR latch and generates a driving signal DRV through a SR latch.

Figure 4:
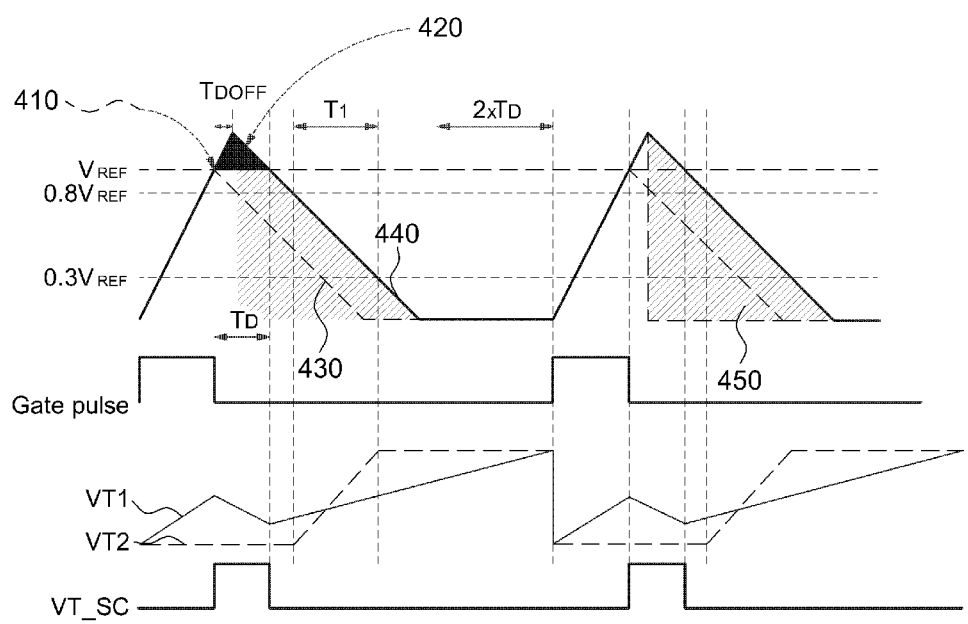
FIG. 4 is a timing diagram illustrating an operation of a gate off delay compensation circuit in the example of FIG. 1.
Figure 5:
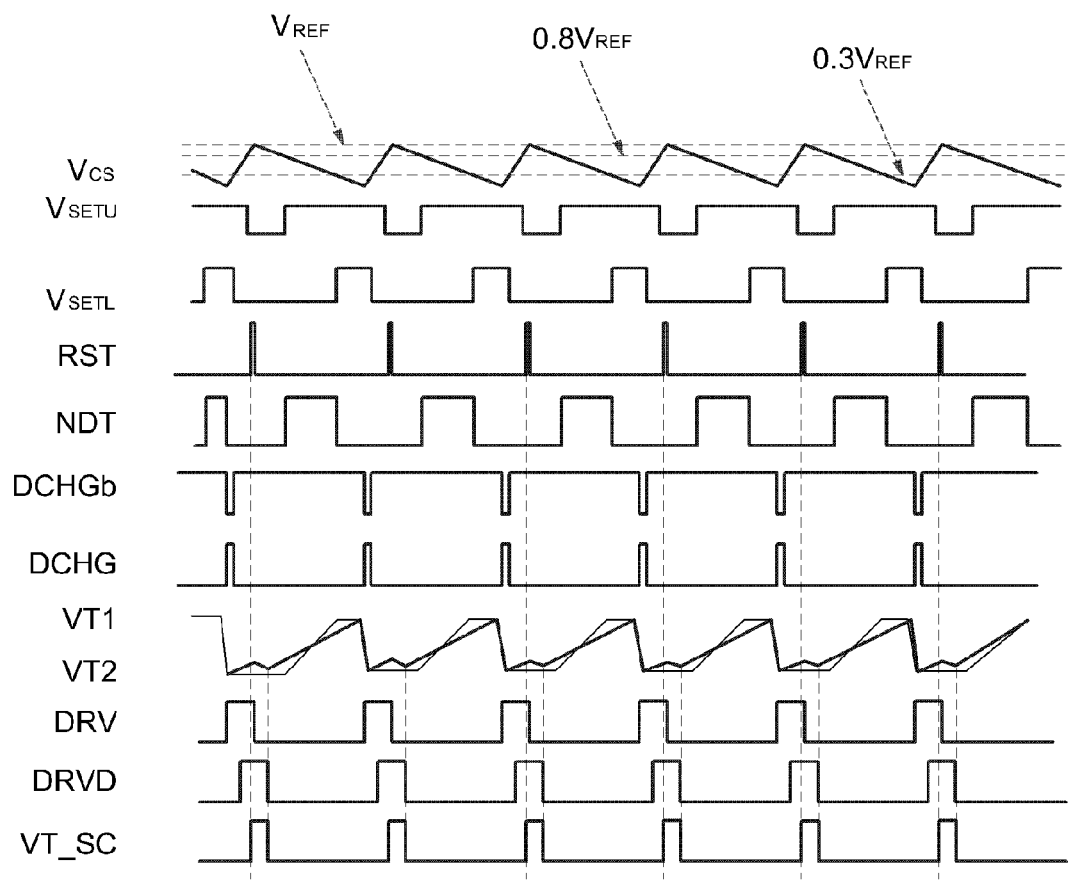
FIG. 5 is a timing diagram illustrating an operation of a gate off delay compensation circuit in the example of FIG. 1 according to a first enable signal, a second enable signal, a third enable signal or a fourth enable signal and a driving signal.

FIG. 4 is a timing diagram illustrating an operation of a gate off delay compensation circuit in the example of FIG. 1 and FIG. 5 is a timing diagram illustrating an operation of a gate off delay compensation circuit in the example FIG. 1 according to a first enable signal, a second enable signal, a third enable signal or a fourth enable signal and a driving signal.

Figure 6:
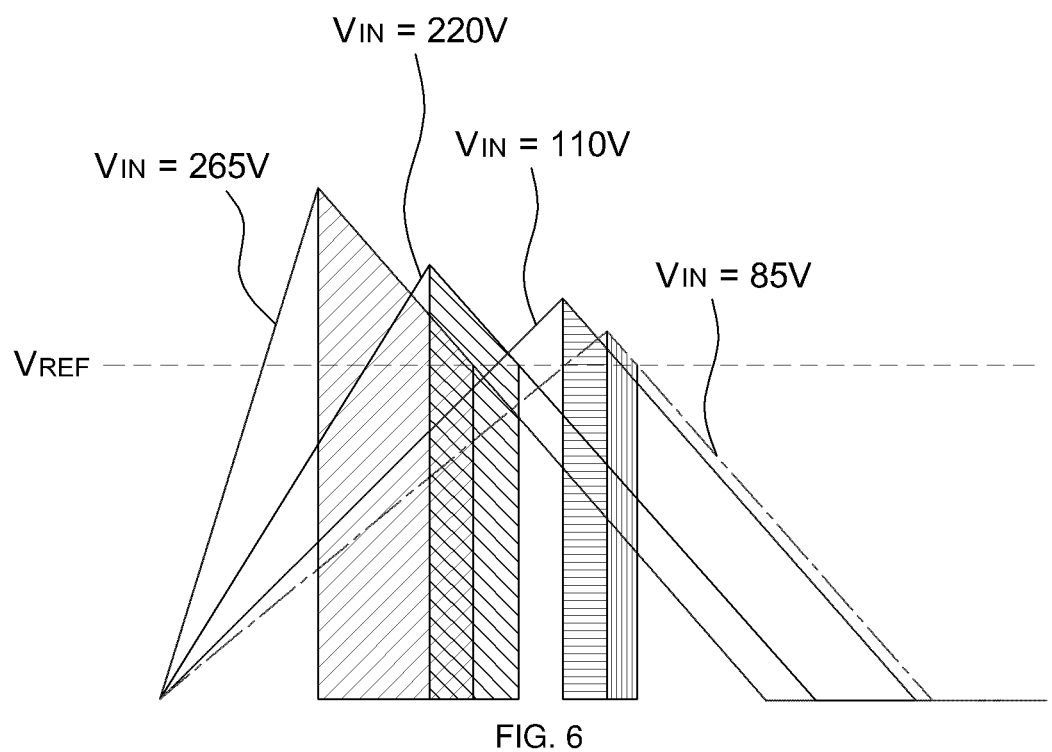
FIG. 6 is a timing diagram illustrating a driving voltage that changes according to an input voltage.
Figure 7:
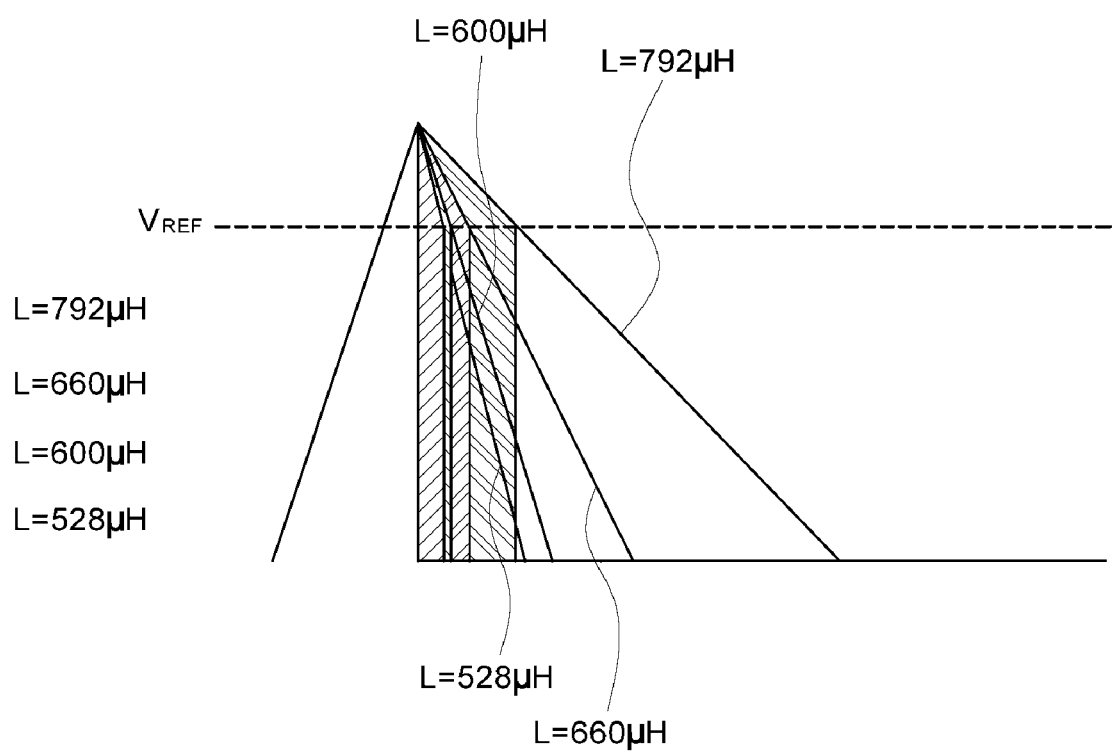
FIG. 7 is a timing diagram illustrating a driving voltage that changes according to an inductance of an inductor.

FIG. 6 is a timing diagram illustrating a driving voltage that changes according to an input voltage and FIG. 7 is a timing diagram illustrating a driving voltage that changes according to an inductance of an inductor.

An ideal AC-coupled driving circuit has a fixed maximum value 410 of a driving current according to a reference voltage. Therefore, a driving voltage is accordingly formed to have an appropriate range as a driving voltage 430.

However, an actual AC-coupled driving circuit generates a gate off delay and propagation delay in the process of operating of a switching element and corresponding driving of a circuit. Maximum values or peak values of a driving current and a driving voltage also increase along with an input voltage according to a gate off delay and propagation delay 420.

In the example of FIG. 4, an amount of current driving an LED 54 corresponds to an area 450 of decline waveform 440 of a driving voltage Vcs. For instance, if the inductor 52 is charged with a driving current IL1 while a driving voltage Vcs increases, an amount of current corresponding to an area 450 of decline waveform 440 flows into the LED 54 while a driving voltage decreases.

In an example, the period determination voltage generator 230 is influenced by a reference voltage $V_{REF}$, and includes a first capacitor charged form an initial point of the period to an end point of the driving voltage and that is discharged in a driving voltage excess interval TD and a second capacitor that is charged in a driving voltage sensing interval T1.

The period determination voltage generator 230 includes the first switching element 231 connected to a terminal of the first capacitor 235 in series and the second switching element 232 connected to the terminal of the first capacitor 235 in parallel. The period determination voltage generator 230 also includes the third switching element 233 connected to a terminal of the second capacitor 236 in series and the fourth switching element 234 connected to the terminal of the second capacitor 236 in parallel. At an initial point of a driving voltage, the first switching element 231 receives the first enable signal DCHGb and the first capacitor 235 is charged with a second mirroring current I3. At an initial point 410 of a driving voltage excess interval TD the second switching element 232 receives the second enable signal DCHG1 and The first capacitor 235 is discharged. Also, the driving voltage excess interval determiner 120 provides a discharge signal VT_SC at an initial point 410 of a driving voltage excess interval TD. The first switching element 231 receives a first enable signal DCHGb again at an end point of a driving voltage excess interval TD.

In this example, at an initial point of a driving voltage sensing interval T1, the third switching element 23 receives the third enable signal NDT and the second capacitor 236 is charged with a current I4 flowing through the transistor 237. At an end point of a driving voltage sensing interval T1, the fourth switching element 234 receives the fourth enable signal DCHG2 and the second capacitor 236 is discharged.

Referring to the example of FIG. 6, when an inductance of the inductor 52 is constant, a slope of increase of a driving voltage Vcs is proportional to an input voltage $V_{IN}$. However, a slope of decrease of a driving voltage Vcs is constant irrespective of the input voltage $V_{IN}$. For example, a slope of increase of a driving voltage Vcs at $V_{IN}$=265V is larger than a slope of increase of a driving voltage Vcs at $V_{IN}$=85V.

In one example, the higher an input voltage $V_{IN}$ is, the faster a driving voltage Vcs increases and accordingly an excess current flowing into the LED 54 increases. Accordingly, a maximum value of a driving voltage Vcs increases and an area 450 of decline waveform 440 of a driving voltage Vcs increases when an input voltage $V_{IN}$ rises. Alternatively put, an area of base of a waveform from a maximum point or peak point of a driving voltage Vcs to an end point of a driving voltage excess interval TD corresponds to an excess current according to a gate off delay and propagation delay.

For example, a driving voltage Vcs increases or decrease in an interval corresponding to a quadrupled value 4*T1 of a driving voltage sensing interval T1. More specifically, when a slope 440 of decrease of a driving voltage Vcs is constant, a sum of an interval in which a driving voltage Vcs rises up to a reference voltage $V_{REF}$, that is, an interval in which a driving signal DRV is high level, and a driving voltage excess interval TD corresponds to a doubled value of a driving voltage sensing interval T1.

In one example, as the first capacitor 235 is discharged in a driving voltage excess interval TD, a period of a driving voltage Vcs extends to a doubled value of a driving voltage excess interval TD. More specifically, when a charge rate of the first capacitor 235 is equal to a discharge rate, a first period determination voltage VT1 is to be additionally charged during a doubled value of a driving voltage excess interval TD for having a same value with a second period determination voltage VT2. Thus, a driving voltage Vcs corresponds to a sum of a quadrupled value of a driving voltage sensing interval T1 and a doubled value of a driving voltage excess interval TD, written as T=4*T1+2*T2.

In one example, when an input voltage $V_{IN}$ increases, a quadrupled value of a driving voltage sensing interval T1 decreases and a doubled value of a driving voltage excess interval TD increases. Meanwhile, when an input voltage $V_{IN}$ decreases, a quadrupled value of a driving voltage sensing interval T1 increases and a doubled value of a driving voltage excess interval TD decreases. Therefore, the gate off delay compensation circuit 100 maintains a certain period of a driving irrespective of a change of an input voltage $V_{IN}$.

The driving voltage period determiner 130 provides a driving signal DRV from an initial point of a period of a driving voltage to an initial point 410 of a driving voltage excess interval. In other words, the driving voltage period determiner 130 provides a driving signal DRV when a first period determination voltage VT1 reaches a second period determination voltage VT2. For example, the driving voltage period determiner 130 ceases to provide a driving signal DRV when a driving a driving voltage Vcs reaches a reference voltage $V_{REF}$. Also, the driving voltage period determiner 130 ceases to generate a driving signal DRV during a proportional interval of a driving current sensing interval T1 and a driving current excess interval T2.

In one example, the driving voltage period determiner 130 ceases to provide a driving signal DRV during a doubled value of a driving current sensing interval T1 and a tripled value of a driving voltage excess interval TD. In other words, a driving signal DRV or a Gate Pulse corresponds to a positive value, that is, a high level or 1, from an initial point of period of a driving voltage Vcs to an initial point of a driving voltage excess interval TD, or during an increase interval in which a driving voltage Vcs increases up to a reference voltage $V_{REF}$ and corresponds to a negative value, that is, a low level or 0, during an interval corresponding to 2*T1+3*TD.

Referring FIG. 7, a slope 440 of decrease of a driving voltage Vcs is in inverse proportion to an inductance of the inductor 52. For example, a slope 440 of decrease of a driving voltage Vcs when an inductance of the inductor 52 corresponds to 528 µH may be larger than a slope 440 of decrease of a driving voltage Vcs when an inductance of the inductor 52 corresponds to 792 µH. In other words, the smaller an inductance of the inductor 52 is, the faster a driving voltage Vcs decreases. Also, a period of a current 450 and a driving voltage Vcs driving the LED 54 decreases accordingly.

Therefore, a gate off delay compensation circuit 100 extends a period of a driving voltage Vcs up to a interval that is proportional to a driving voltage excess interval TD in order to decrease an average driving current and an average driving voltage and in order to decrease a variation of a driving current according to a change of a input voltage $V_{IN}$. For example, a gate off delay compensation circuit 100 possibly actualizes a driving current that has a high accuracy in the range of a wide input voltage. Also, a gate off delay compensation circuit 100 potentially extends a period of a driving voltage Vcs in order to improve an efficiency of an integrated circuit and in order to solve a heating problem of a system.

The apparatuses, units, modules, devices, and other components illustrated in FIGS. 1-7 that perform the operations described herein with respect to FIGS. 1-7 are implemented by hardware components. Examples of hardware components include controllers, sensors, generators, drivers, memories, comparators, arithmetic logic units, adders, subtractors, multipliers, dividers, integrators, and any other electronic components known to one of ordinary skill in the art. In one example, the hardware components are implemented by computing hardware, for example, by one or more processors or computers. A processor or computer is implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices known to one of ordinary skill in the art that is capable of responding to and executing instructions in a defined manner to achieve a desired result. In one example, a processor or computer includes, or is connected to, one or more memories storing instructions or software that are executed by the processor or computer. Hardware components implemented by a processor or computer execute instructions or software, such as an operating system (OS) and one or more software applications that run on the OS, to perform the operations described herein with respect to FIGS. 1-7. The hardware components also access, manipulate, process, create, and store data in response to execution of the instructions or software. For simplicity, the singular term "processor" or "computer" may be used in the description of the examples described herein, but in other examples multiple processors or computers are used, or a processor or computer includes multiple processing elements, or multiple types of processing elements, or both. In one example, a hardware component includes multiple processors, and in another example, a hardware component includes a processor and a controller. A hardware component has any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-7 that perform the operations described herein with respect to FIGS. 1-7 are performed by a processor or a computer as described above executing instructions or software to perform the operations described herein.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any device known to one of ordinary skill in the art that is capable of storing the instructions or software and any associated data, data files, and data structures in a non-transitory manner and providing the instructions or software and any associated data, data files, and data structures to a processor or computer so that the processor or computer can execute the instructions. In one example, the instructions or software and any associated data, data files, and data structures are distributed over network-coupled computer systems so that the instructions and software and any associated data, data files, and data structures are stored, accessed, and executed in a distributed fashion by the processor or computer.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A gate off delay compensation circuit, comprising:
    a sensing interval determiner configured to determine an interval in which a driving voltage corresponds to a first level and second level of a reference voltage as a driving voltage sensing interval;
    a driving voltage excess interval determiner configured to determine a driving voltage excess interval defined as an interval in which the driving voltage is larger than the reference voltage; and
    a driving voltage period determiner configured to determine a period of the driving voltage based on the driving voltage sensing interval and the driving voltage excess interval.

2. The gate off delay compensation circuit of claim 1, wherein the sensing interval determiner comprises a reference voltage generator configured to receive a dimming voltage related to a light brightness to generate the reference voltage.

3. The gate off delay compensation circuit of claim 2, wherein the reference voltage generator comprises a Digital Analog Converter (DAC) configured to output a voltage corresponding to a value of current induced by the dimming voltage.

4. The gate off delay compensation circuit of claim 3, wherein the reference voltage generator further comprises a voltage follower configured to follow the output voltage to generate the reference voltage.

5. The gate off delay compensation circuit of claim 1, wherein the sensing interval determiner comprises a voltage divider configured to divide the reference voltage into a first interval reference voltage having a first level and a second interval reference voltage having a second level.

6. The gate off delay compensation circuit of claim 1, wherein the sensing interval determiner comprises a period determination voltage generator configured to generate each of a first period determination voltage and a second period determination voltage by charging and discharging each of a first capacitor and a second capacitor, wherein the first capacitor and the second capacitor have different capacitances.

7. The gate off delay compensation circuit of claim 1, wherein the sensing interval determiner comprises:
    a first capacitor configured to respond to the reference voltage, to be charged from an initial point of the period to an end point of the period, and to be discharged in the driving voltage excess interval; and
    a second capacitor configured to be charged during the driving voltage sensing interval.

8. The gate off delay compensation circuit of claim 7, wherein the sensing interval determiner comprises:
    a first switching element connected to a terminal of the first capacitor in series and a second switching element connected to the terminal in parallel,
    wherein the first switching element receives a first enable signal at the initial point of the period and the second switching element receives a second enable signal at an initial point of the driving voltage excess interval.

9. The gate off delay compensation circuit of claim 7, wherein the sensing interval determiner comprises:
    a third switching element connected to a terminal of the second capacitor in series and a fourth switching element connected to the terminal in parallel,
    wherein the third switching element receives a third enable signal at an initial point of the driving voltage sensing interval and the fourth switching element receives a fourth enable signal at an end point of the driving voltage sensing interval.

10. The gate off delay compensation circuit of claim 1, wherein the driving voltage excess interval determiner receives a first interval reference voltage and a second interval reference voltage, the reference voltage and the driving voltage to generate a first enable signal, a second enable signal, a third enable signal or a fourth enable signal.

11. The gate off delay compensation circuit of claim 1, wherein the driving voltage excess interval determiner provides a first enable signal, a second enable signal, a third enable signal or a fourth enable signal to respectively control a first switching element, a second switching element, a third switching element or a fourth switching element.

12. The gate off delay compensation circuit of claim 1, wherein the driving voltage period determiner receives a first period determination voltage and a second period determination voltage from the sensing interval determiner to generate a driving signal.

13. The gate off delay compensation circuit of claim 1, wherein the driving voltage period determiner provides a driving signal from an initial point of the period to a initial point of the driving voltage excess interval.

14. A light emitting diode light apparatus, comprising:
Light Emitting Diodes (LEDs);
a bridge diode configured to full-wave rectify an alternating current (AC) input voltage; and
a gate off delay compensation circuit configured to receive a driving power supply to drive the LEDs,
wherein the gate off delay compensation circuit comprises
a sensing interval determiner configured to determine an interval in which a driving voltage corresponds to a first level and second level of a reference voltage as a driving voltage sensing interval,
a driving voltage excess interval determiner configured to determine a driving voltage excess interval defined as an interval in which the driving voltage is larger than the reference voltage and
a driving voltage period determiner configured to determine a period of the driving voltage based on the driving voltage sensing interval and the driving voltage excess interval.

15. A circuit, comprising:
a driving voltage period determiner configured to determine a period of a driving voltage based on a driving voltage sensing interval and a driving voltage excess interval, wherein the driving voltage sensing interval is an interval in which a driving voltage corresponds to a first level and second level of a reference voltage and the driving voltage excess interval is defined as an interval in which the driving voltage is larger than the reference voltage.

16. The circuit of claim 15, further comprising a sensing interval determiner configured to determine the driving voltage sensing interval.

17. The circuit of claim 16, wherein the sensing interval determiner comprises a voltage divider configured to divide the reference voltage into a first interval reference voltage having a first level and a second interval reference voltage having a second level.

18. The circuit of claim 16, wherein the sensing interval determiner comprises a period determination voltage generator configured to generate each of a first period determination voltage and a second period determination voltage by charging and discharging each of a first capacitor and a second capacitor, wherein the first capacitor and the second capacitor have different capacitances.

19. The circuit of claim 16, wherein the sensing interval determiner comprises:
a first capacitor configured to respond to the reference voltage, to be charged from an initial point of the period to an end point of the period, and to be discharged in the driving voltage excess interval; and
a second capacitor configured to be charged during the driving voltage sensing interval.

20. The circuit of claim 15, further comprising a driving voltage excess interval determiner configured to determine the driving voltage excess interval.

* * * * *